3,113,826
METHOD OF MODIFYING CELLULOSE WITH FORMALDEHYDE USING LEWIS ACID CATALYSTS, SOLUTIONS FOR USE IN SUCH METHOD, AND PRODUCTS THEREOF
George C. Daul and Thomas F. Drake, Mobile, Ala., assignors, by mesne assignments, to Courtaulds, Limited, London, England, a British company
No Drawing. Filed Jan. 11, 1961, Ser. No. 81,956
Claims priority, application Great Britain Dec. 24, 1958
18 Claims. (Cl. 8—116.4)

This invention relates to a method for improving the properties of cellulose, and in particular to a method for cross-linking cellulose by means of formaldehyde, to compositions for effecting such cross-linking, and to improved cellulose material cross-linked by means of formaldehyde.

This application is a continuation-in-part of our applications Serial No. 792,696, filed February 12, 1959, Serial No. 38,418, filed June 24, 1960, and Serial No. 51,781, filed August 25, 1960, all of which are now abandoned.

For many years it has been known that when cellulose is treated with formaldehyde, various properties, in particular its resistance to swelling by water, are improved. It is considered that such changes occur through cross-linking of the cellulose chains at suitable positions along their length. Although the ability of formaldehyde to cross-link cellulose has been known for perhaps fifty years, no substantial commercial use has been made of this ability, because the processes so far proposed have all had very serious practical drawbacks.

Thus, one class of prior processes have used relatively vigorous treating conditions, i.e. high formaldehyde concentrations at low pH. With such processes, extensive cross-linking is effected. However, the cellulose material is degraded in the process and the loss of tensile strength is unacceptably high.

Attempts have been made to avoid this adverse effect by using milder conditions. However, in this case, the formaldehyde does not become permanently bound to the cellulose and in large measure is lost in subsequent washing.

Because no practical process has been devised using formaldehyde for cross-linking, the art has generally gone to more complex cross-linking agents, such as higher bi-functional aldehydes, condensation products of amino compounds and formaldehyde, epoxy compounds and the like. Such materials are without exception more expensive than formaldehyde and often introduce further problems, such as discoloration and chlorine retention which do not arise with formaldehyde. They are often leached out on washing, whereas formaldehyde cross-linking is permanent under the most severe washing. Moreover, such compounds are of relatively large molecular size and it is difficult for them to penetrate into the interior of the cellulose. Formaldehyde, on the other hand, being of small molecular size, penetrates cellulose bodies with comparative ease, giving even and thorough treatment.

OBJECTS

It is an object of the present invention to provide a simple, economical method for improving the properties of cellulose.

It is another object of the invention to provide a simple and economical process of reducing the water imbibition of cellulose.

It is another object of the invention to provide a simple and economical method whereby cellulose may be cross-linked.

It is another object of the invention to provide a simple and economical method for crease-proofing cellulose textile materials.

It is another object of the invention to provide a simple and economical method whereby cellulose fibrous material may be reacted with formaldehyde with minimal adverse effect on strength and wear resistance.

It is a further object of the invention to provide cross-linked cellulosic material containing relatively large amounts of formaldehyde chemically bound directly to the cellulose, whose tensile strength approaches that of material which has not been cross-linked.

It is another object of the invention to provide improved treating solutions for use in cross-linking cellulose.

STATEMENT OF THE INVENTION

In accordance with the process aspects of the invention, these and other objects are attained by means of a method which comprises impregnating cellulose with formaldehyde and with a curing agent, the curing agent being a metallic salt which is a Lewis acid in the solid state; the pickup of curing agent from said solution being at least about 0.0030 g.-mol, per 100 g. of cellulose; and drying and curing the impregnated cellulose. Preferably the mol ratio of salt to formaldehyde deposited on said cellulose is at least 1:17; but in any case the amount of formaldehyde chemically bound to the fiber is between about 0.1 and about 3.0% by weight or even as high as about 7% by weight and there is at least that much present on the fiber at curing. Preferably, moreover, the impregnation takes place at pH 5 to 10, and the curing agent is selected to be soluble to the extent of at least .03 mol liter at pH 5 or above, at 20° C.

In its product aspects, the invention further comprises cross-linked regenerated cellulose material containing between about 0.10 and about 3.0% or even as high as about 7% by weight formaldehyde chemically bound directly to the cellulose and having a dry tensile strength not less than 80% that of the same material not cross-linked.

The invention further comprises a treating composition for cross-linking cellulose containing between about 0.5 and about 6% formaldehyde and a curing agent selected from the group consisting of metallic salts which are Lewis acids in the solid state, said solution having a pH of between about 5 and about 10, the concentration of curing agent being at least 0.030 g.-mol/liter and the molar proportion of curing agent to formaldehyde being preferably at least 1:17.

THEORETICAL CONSIDERATIONS

The chemistry of cellulose is extraordinarily complex. Therefore, although the following interpretation of experimental data is believed to be justified, it is offered merely for the guidance of those skilled in the art. The inventors intend only to be bound by the claims appended to this specification.

When cellulose is immersed in an aqueous solution of formaldehyde and a curing agent, both formaldehyde and curing agent are picked up, physically, by the cellulose. During drying, a certain amount of the formaldehyde picked up evaporates, leaving residual, unbound, formaldehyde. Upon curing, this unbound formaldehyde either cross-links, or is driven off, viz.

where F represents the unbound formaldehyde present on the fiber at any time, G is formaldehyde vapor and M represents bound formaldehyde.

The evaporation of formaldehyde may be expressed as $$\frac{dG}{dt} = k_1 F$$

The rate constant, $k_1$, depends upon the nature of the curing agent, and upon the environmental conditions. With a suitable agent and optimum environmental conditions, the rate constant, $k_1$, can be reduced to zero.

The rate at which formaldehyde is taken up by the cellulose in cross-linking may be expressed as $$\frac{dM}{dt} = k_2 F$$

Surprisingly, it has been found that the rate constant $k_2$ is not a function of initial formaldehyde concentration, as might have been supposed, but rather is a function of the concentration of curing agent on the cellulose, i.e.

$$k_2 = f(CA)$$

where (CA) is the concentration of curing agent on the cellulose. This function has been found to be generally of the negative exponential form of the type $$F(CA) = 1 - e^{\frac{-CA}{b}}$$

where $b$ is a constant.

When $k_2$ is plotted against curing agent concentration, the general shape of the curve is found to be typical of surface adsorption phenomena.

Now is has been generally accepted that the cross linking reaction is catalyzed by acids, in the classical sense. However, in an investigation of numerous possible catalysts, a number of compounds were found which, though giving rise to $H^+$ ions in aqueous solution, would not catalyze the cross-linking reaction. Typical among these are $(NH_4)_2SO_4$, and $(NH_4)_2HPO_4$.

This apparent inconsistency vanishes, however, if it is assumed that the cross-linking of cellulose by formaldehyde is promoted by substances which display surface acidity in the Lewis sense, i.e. which are electron acceptors, in the solid state.

Thus, the surface acidity in the Lewis sense of numerous salts in the solid state has been investigated. Salts such as $(NH_4)_2SO_4$, $(NH_4)_2HPO_4$, $NaCl$ and $K_2CO_3$ which show no surface acidity in the solid state do not catalyze the cross-linking reaction. Salts such as $Al_2(SO_4)_3$, $Mg(ClO_4)_2$, $MgCl_2.6H_2O$, $ZnCl_2$, $Zn(NO_3)_2$, $ZnSO_4$, $CaCl_2$, $CuSO_4$ and $Mg(NO_3)_2$ which do exhibit surface acidity in this sense will catalyze cross-linking. It is therefore apparent that, in order to effect cross-linking, the curing agent should be a Lewis acid in the solid state.

Not all these Lewis acids, however, are suitable for formaldehyde cross-linking of cellulose. As pointed out above, for successful operation not only is cross-linking required, but degradation of the cellulose must be prevented.

In this respect, so far as natural cellulose fibers such as cotton are concerned, a distinction must be made between loss of physical strength due to cross-linking and loss due to destruction or degradation of the cellulose chains. Whenever cotton is cross-linked, whether by formaldehyde or resinous materials, a certain reduction in tensile strength occurs. This is due to the cross-linking itself, as is demonstrated by the fact that with materials such as dimethylol ethylene urea (which can easily be removed from the cellulose), the original strength can be restored by removal of the cross-linking agent. This "reversible" loss of strength is not avoided by the present treatment. In numerical value it amounts to between about 10% and about 50% for cotton.

This "reversible" loss of strength due to cross-linking is not experienced with regenerated cellulose. On the contrary, cross-linking, per se, increases the strength of regenerated cellulose.

Quite apart from the "reversible" effect observed in natural cellulose fibers, a further, irreversible loss of strength has hitherto been experienced with prior formaldehyde cross-linking processes on both natural and regenerated cellulose. This latter loss of strength is due to degradation or depolymerization of the cellulose chains, usually by the action of hydrogen ions on the cellulose. Thus, for example, materials such as copper sulfate, and aluminum sulfate, although they are Lewis acids and will promote cellulose cross-linking, also cause degradation of the cellulose at an unacceptably high rate, because in aqueous solution they are strongly acid, in the classical ($H^+$) sense.

It is also considered that some substances which may be Lewis acids, but which do not normally give rise to $H^+$ ions in aqueous solutions will effect cellulose degradation if the impregnated cellulose is maintained at a high temperature for an extended time.

According to the present invention, the problem of cross-linking without degradation is met by reacting cellulose with formaldehyde in the presence of a substance which is a Lewis acid in the solid state but which is not strongly acid (in the classical sense) in aqueous solution, and which can be used in aqueous solution in relatively high concentrations and at relatively high pH. As noted above, it has been discovered that the rate at which the formaldehyde-cellulose reaction takes place is a function of the concentration of curing agent on the cellulose. The invention, therefore, uses large molar proportions of curing agent to avoid prolonged curing times and the cellulose degradation which may be caused thereby. Shorter curing times are obviously also advantageous for economic reasons.

THE CELLULOSE

Cellulose in any form may be treated according to the invention. This may include paper, board, or film. The invention finds its most attractive application, however, in the treatment of cellulose filamentary material. Such filamentary material may be of natural origin such as cotton, linen, hemp, jute, ramie or sisal, or of synthetic origin, i.e. rayon made by the viscose, cuprammonium or nitrate process or by the saponification of organic esters of cellulose, e.g. cellulose acetate.

The filamentary material may be treated in the form of staple fiber, as continuous filament, in the form of tow, yarn or thread. The process can also be applied to structures containing cellulose fibers. The structures may be woven or knitted textile fabrics, or textile fabrics of other kinds, for example, the so-called non-woven fabrics, or even paper. The fabrics may be of various constructions; thus they may consist wholly of cellulose fibers or in part of these fibers and in part of fibers of other kinds, for example, cellulose acetate (acetone-soluble cellulose acetate or cellulose triacetate), or fibers of synthetic linear polymers, for example of polyamides, such as nylon 6 or nylon 66, or of polyesters, for example polyethylene terephthalate, or of addition polymers derived from acrylonitrile. The cellulose fibers in the fabrics may be in the form of staple fibers or of continuous filaments. Preferably when blends are treated, the cellulose fibers comprise at least 35% by weight of the blend.

If desired, the cellulose, prior to treating, may have been dyed with any one of many common dyes, without adverse effect.

THE FORMALDEHYDE

The formaldehyde used may be added to the treating solution as the normal 40% aqueous commercial solution.

Other sources, e.g. paraformaldehyde, may, however, be used as desired.

THE CURING AGENT

As noted above, the curing agent should be a metallic salt which is a Lewis acid.

In determining whether any given salt is a Lewis acid, the procedure described by Walling JACS 72, pp. 1164–1168 and Pines and Haag JACS 82, pp. 2471–2483, may be used. A particularly suitable test is to take a small quantity of the salt, dried to remove surface moisture, and allow it to stand overnight with a solution of the leuco base of Malachite Green (4,4-di(dimethylamino)-triphenyl methane) in a dry, non-polar solvent such as cyclohexane or isooctane. The development of a green color at the salt surface indicates that the salt is a Lewis acid. An alternative test may be based on the response of a compound to an indicator such as Methyl Red (whose range in aqueous solution is pH 4.4–6.2) under the conditions described by Walling (72 JACS 1164). Indicators such as Methyl Red have the drawback of giving positive reactions in the presence of traces of acid (in the classical sense). On the other hand, the Malachite Green leuco base reaction appears to be inhibited by traces of classical acids.

In addition to being a Lewis acid, the curing agent should preferably be soluble and form no precipitate in aqueous solution at pH 5 at concentrations of at least 0.03 mol/liter at 20° C. For reasons explained more fully below, solutions at pH 6 or above are highly desirable for cotton and, therefore, when cotton is to be treated, the curing agent should be soluble at that pH. Salts which remain soluble at higher pH are of course more advantageous. Obviously, salts which are highly colored or highly toxic or become so during the process are undesirable.

Salts which meet these qualifications are in general those in which the metal is bivalent and belongs to group II of the periodic table and the acid radical is that of a strong monobasic acid which is at least 50% ionized in normal aqueous solution at 18° C., such as hydrochloric, hydrobromic, hydriodic, nitric, perchloric and thiocyanic acids. Of most interest are salts of calcium, magnesium, strontium, barium and zinc. Examples of suitable salts would include $CaCl_2$, $CaBr_2$, $CaI_2$, $Ca(NO_3)_2$, $Ca(SCN)_2$, $Mg(NO_3)_2$, $MgCl_2$, $MgBr_2$, $Mg(ClO_4)_2$, $MgI_2$, $ZnCl_2$, and $Zn(NO_3)_2$ as well as $SrCl_2$, $BaCl_2$, and $CdCl_2$. $ZnSO_4$ may also be employed. Either the anhydrous salt or a hydrate may be used, as may mixtures of salts. Generally the magnesium salts are preferred as being less acidic (in the classical sense) than the zinc salts and more effective (as curing agents) than the other salts mentioned. The magnesium halides are especially favored and of these, magnesium chloride is outstanding.

Magnesium chloride is of exceptional value in the present process for several reasons. First, it is stable in solutions with formaldehyde at pH up to about 9. This enables even the most sensitive cellulose material to be impregnated and dried with minimal damage. Moreover, magnesium chloride has a very pronounced effect in lowering the vapor pressure of formaldehyde, possibly as the result of a complex formation. This tends to prevent loss of formaldehyde during curing, increasing the efficiency of the process.

THE TREATING SOLUTION

The formaldehyde and curing agents are normally applied from aqueous solutions. Other solvents, e.g. methanol and/or ethanol may be present without detrimental effect, but the solution should contain at least 10% by weight water. Separate solutions may be used for the formaldehyde and curing agent, but no advantage is gained thereby.

The concentration of formaldehyde may vary to a considerable extent, depending on whether natural or regenerated cellulose is treated and on the physical form of the fiber. Moreover, where high crease recovery is required, more bound formaldehyde is required in the final product and a higher concentration is used than where the objective is merely a decrease in water imbition.

In general, it has been found that the amount of curing agent deposited on the fiber and the efficiency of the curing agent in reacting unbound formaldehyde with cellulose are more significant than the concentration of formaldehyde in the solution, provided that enough formaldehyde is present during curing to furnish the desired quantity of formaldehyde required to be bound to the cellulose for the particular physical properties sought. An overall range of recommended concentrations would extend from about .5% to about 6% by weight. Rayon fabric will normally require 1 to 6%; cotton fabric 0.5–4.0% by weight. It will be understood that higher concentrations may be employed, but serve no useful purpose. Indeed, it is one of the advantages of the present application that relatively dilute formaldehyde solutions can be used. Such solutions are less apt to lose formaldehyde by evaporation and are easier to work with from the point of view of operator health and comfort than the more concentrated solutions prescribed in many prior processes.

The concentration of curing agent may vary considerably, depending on the agent. Normally it will be between about 0.03 and about 0.90 g.-mol/liter; preferably between about 0.1 and about 0.45 g.-mol/liter. However, it is the proportion of curing agent deposited on the fiber and to the extent that the minimum amount of formaldehyde must be present during curing, the molar ratio of agent to formaldehyde, which is significant.

The pH of the solution will depend on the material being treated. Natural cellulose, such as cotton, is generally more sensitive to acid degradation and therefore when cotton is to be treated, a higher pH must be used than is necessary with regenerated cellulose. Generally the treating solution pH should not be less than 5 for regenerated cellulose and not less than 6 for cotton.

Some of the salts listed above when put into water with formaldehyde at use concentrations will not give pH's in this range. When used in the present invention they are, therefore, preferably buffered, for example, with sodium carbonate, sodium bicarbonate, or sodium hydroxide, to a pH of at least 5, or at least 6 if cotton is to be treated.

While the upper pH limit is not especially critical, some of the salts most useful with the present invention will form precipitates at pH's above about 10.

The temperature of the treating solution is not especially significant. Room temperature is satisfactory, although lower temperatures may be used to prevent loss of formaldehyde. Normally, temperatures of say 15° C. to 50° C. are used.

The treating solution may contain various textile auxiliaries such as softening agents, lubricants, water repellents and the like. In general, these materials function in the normal way, i.e. as they would were no formaldehyde present.

TREATING TECHNIQUES

The treating solution is applied to the cellulose material in such a manner that after impregnation (and drying) the material contains at least about 0.003, normally between about 0.0038 and about 0.09 g.-mol, and preferably between about 0.008 and about 0.054 g.-mol, of curing agent, per 100 g. of cellulose. Sufficient formaldehyde is picked up so that bearing in mind losses in drying and curing between about .1% and about 3%, or in some cases as high as about 7% will remain on the fiber after curing. For reasons of economy the molar ratio of curing agent to formaldehyde deposited on the fiber is usually at least 1:17, normally from about 1:17 to about 5:1, and preferably from about 1:12 to about 1:1.

The actual manipulative steps by which the treating solution is applied will vary with the physical form of the cellulosic material. In the case of staple fiber, a mat or blanket of the material is normally sprayed with the solution followed by a squeezing to remove excess. Preferably the technique described in Daul et al. Patent No. 2,902,391 is used. A continuous filament may be passed through a bath or wound on a roller over which the reagent is sprayed. A tow may be laid down in a plaited pattern and sprayed; or passed continuously through a bath. Woven and knitted fabrics may be padded using techniques well known to the art.

In all of these cases, the treatment is preferably carried out so that after removal of excess liquor by squeezing or other means, between say 120 and say 80% of liquor (based on the weight of bone dry unimpregnated material) remains on the material.

Following impregnation, the material is dried at say 30–110° C. for whatever time is required to reduce the moisture content to say 5% by weight of the bone dry material and then cured by heating to temperatures from about 110° C. to about 180° C. for periods which may range from say 30 minutes to a few (say about 5) seconds.

The temperatures and time for curing must be carefully selected, having in mind the pH at which the treatment has been conducted and the curing agent used. Thus, where a pH of 5 has been used, curing must be conducted under mild conditions within the range set forth, i.e. if a high temperature is used, a very short time should be used; or if a long time is used, the temperature should be low, within the range set forth. If more rigorous curing conditions are employed, and the impregnation was at a low pH, there is danger of tendering the material.

By their nature most Lewis acids are capable of forming hydrates and since the present treatment involves application of aqueous solutions, the curing agent is normally deposited as a hydrate. With most salts at least a part of the hydrate water is evolved during curing. It has been found that during this water evolution the cellulose-formaldehyde reaction is inhibited or at least markedly depressed. To avoid such inhibition or depression it is therefore desirable to conduct the curing at temperatures either above, below or between the range or ranges at which the particular curing agent used loses large amounts of water of hydration.

Since it is desirable to conduct curing as expeditiously as possible temperatures below dehydration temperature are not usually employed. At the same time extremely high temperatures are to be avoided for fear of damage to the cellulose.

Because of these factors, salts which are Lewis acids and which can be heated at intermediate temperatures without water evolution are extremely desirable as curing agents, other things being equal. One of the properties that makes magnesium chloride especially attractive as a curing agent in the present process is that although it loses some water at about 120° C., there is an intermediate temperature range in which comparatively little water is evolved and the compound can therefore function effectively as a curing agent without a prolonged curing time or an excessively high temperature.

Zinc salts are generally more likely to cause degradation than, say, magnesium salts and greater care must be exercised in curing when the curing agent is a zinc compound.

As the pH of the treatment is increased, more rigorous curing conditions may be used, within the range set forth, without adversely affecting the properties of the material.

Obviously the drying and curing steps may be combined in a single treatment, if desired.

SUBSEQUENT TREATMENT

Following the curing stage, the cellulose may be washed, if desired, with $NH_3$, urea or other formaldehyde acceptor to remove unbound formaldehyde and curing agent.

If desired, it may then be subjected to any of a number of conventional after treatments. For example, cellulose fabrics, following treatment by the present process can be mercerized, or sanforized, or both. It is an important advantage of the invention that it permits normal textile trade regenerated cellulose fabrics to be mercerized or sanforized.

THE PRODUCT

The product obtained from the present process contains between about 0.10 and about 3% or in some cases as high as 7% formaldehyde chemically bound directly to the cellulose (based on air dry unimpregnated material), as determined by the amount of formaldehyde liberated by complete hydrolysis of the cellulose with 12N $H_2SO_4$.

When the material treated is fibrous material, the amount which must be incorporated in the fiber will depend on the effect desired and on the type of cellulose treated. For example, natural cellulose fibers such as cotton will normally have only between about 0.10 and about 1.25% bound formaldehyde, while regenerated cellulose will range from 0.10 up to 3.0% though in some cases it may reach as high as 7%. More formaldehyde must be bound where a fabric having a high wrinkle recovery is required than when mere dimensional stability is sought. Thus to give high (at least 240° Monsanto) wrinkle recovery to regenerated cellulose fabric, at least 0.80% bound formaldehyde (corresponding to a washer imbibition of about 40%) is necessary, although 0.20% (corresponding to a water imbibition of about 48%) will give dimensional stability. High wrinkle recovery with natural fibers such as cotton is obtained at about 0.4% bound formaldehyde.

When the initial material treated in accordance with the invention is regenerated cellulose, the characteristics of the product are quite different from those of the starting material. Thus, although normal regenerated cellulose swells so rapidly in caustic soda that mercerization of regenerated cellulose fabric is not practical, the product of the present invention has a greatly lowered swellability in caustic soda and can be mercerized without difficulty.

Again, regenerated cellulose will dissolve in cuprammonium hydroxide, while the products of the present invention will not. Further, while the water imbibition of conventional textile grade viscose staple fiber is about 100–115%, the water imbibition of the present products can be reduced to around 30–40%.

When cellulose fabrics are treated in accordance with the invention, their dry crease recovery is greatly improved, and is usually increased by at least 50° (W+F). In some cases it may be increased by as much as 150° (W+F). Moreover, permanent dimensional stability is imparted, even after scouring at acid pH. Since no chlorine retentive groups are introduced into the cellulose, the resistance of fabric treated in accordance with the invention to damage by chlorine bleaches is high.

The invention will be further described with reference to the following specific examples which are given for purpose of illustration only and are not to be taken as in any way limiting the invention beyond the scope of the appended claims.

*Example 1*

This example illustrates a technique which may be used to determine whether or not a given salt is a Lewis acid capable of cross-linking cellulose.

The leuco base of Malachite Green is purified by repeated recrystallization from absolute methanol until the solid gives no green color when dissolved in glacial acetic acid. A 0.5% by weight solution of the purified base in pure cyclohexane is then prepared.

Approximately 5–10 grams of the salt to be tested is spread on a shallow dish and placed in a moving air stream at 80° C. for about 30 minutes. A small portion, say 0.5 g. of the dried salt is then placed in a test tube and 2 to 3 ml. of the leuco base-cyclohexane solution is added to the tube. The mixture is allowed to stand for 12 hours. The development of a green color on the surface of the salt at the salt-liquid interface indicates that the salt is a Lewis acid.

The results obtained with this test on a few salts are listed in Table I below. In the table "positive" means that a green color developed.

TABLE I

| Salt: | Reaction |
|---|---|
| $MgCl_2 \cdot 6H_2O$ | Positive. |
| $Al_2(SO_4)_3$ | Do. |
| $Zn(NO_3)_2$ | Do. |
| $CuSO_4$ | Do. |
| $CaCl_2$ | Do. |
| $(NH_4)_2SO_4$ | Negative. |
| $(NH_4)_2HPO_4$ | Do. |

Similar results can be obtained using a 0.1% solution of Methyl Red in isooctane in place of the Malachite Green leuco base solution.

Care should be taken to see that prior to testing the salts are dried to remove surface water, since this will interfere with the above tests. For example, if $CaCl_2$ or $MgSO_4 \cdot 7H_2O$ are permitted to stand in the air for several hours and tested without drying, they will give no color. Yet if properly dried, as outlined above, they will give a positive test and, with proper curing temperatures, can be made to promote the formaldehyde-cellulose reaction.

*Example 2*

Aqueous solutions were prepared by adding commercial 40% formaldehyde and magnesium chloride hexahydrate to water. These solutions varied in formaldehyde content from 0.5 to 4% by weight and in $MgCl_2 \cdot 6H_2O$ content from 0.4 to 3.2% by weight. In each case the mole ratio of $MgCl_2$ to HCHO was 1 to 8.45. Samples of never-dried viscose rayon staple fiber, still in the gel state after spinning, were soaked in the solutions for five minutes and then centrifuged for three minutes at 1000 G. Pick-up after spinning was 100% on the weight of the never-dried fiber, or about 135% on a bone dry basis. The samples were then dried at 80° C. for 30 minutes and cured at 160° C. for 6 minutes.

One half of each sample of fiber was rinsed free of salt, dried and analyzed for water imbibition (WI).[1] The other half was secured for 1 hour at 95–100° C. in water at pH 8 and tested for water imbibition. The results are shown in Table II.

TABLE II

| Sample | Wt. percent HCHO in solution | Wt. percent $MgCl_2 \cdot 6H_2O$ in solution | Pickup mols $MgCl_2 \cdot 6H_2O$ per 100/g. cell. | WI, percent before scour | WI, percent after scour |
|---|---|---|---|---|---|
| Control | 0 | 0 | 0 | 105 | 100 |
| 1 | 0.5 | 0.4 | 0.00266 | 90 | 83 |
| 2 | 1.0 | 0.8 | 0.00532 | 68 | 64 |
| 3 | 1.5 | 1.2 | 0.00798 | 62 | 63 |
| 4 | 2.0 | 1.6 | 0.0106 | 54 | 56 |
| 5 | 3.0 | 2.4 | 0.0159 | 50 | 47 |
| 6 | 4.0 | 3.2 | 0.0214 | 47 | 40 |

*Example 3*

The procedure of Example 2 was repeated using proportions of HCHO and $MgCl_2 \cdot 6H_2O$ such that the mole ratio of $MgCl_2$ to HCHO was 1 to 6.66. The results were as follows:

TABLE III

| Sample | Wt. percent HCHO in solution | Wt. percent $MgCl_2 \cdot 6H_2O$ in solution | Pickup mols $MgCl_2 \cdot 6H_2O$ per 100 g. cell. | WI, percent before scour | WI, percent after scour |
|---|---|---|---|---|---|
| 1 | 0.5 | 0.5 | 0.00332 | 79 | 74 |
| 2 | 1.0 | 1.0 | 0.00665 | 68 | 61 |
| 3 | 1.5 | 1.5 | 0.0100 | 56 | 57 |
| 4 | 2.0 | 2.0 | 0.0133 | 53 | 53 |
| 5 | 3.0 | 3.0 | 0.0200 | 45 | 48 |
| 6 | 4.0 | 4.0 | 0.0266 | 41 | 42 |

*Example 4*

The procedure of Example 2 was again repeated using proportions of HCHO and $MgCl_2 \cdot 6H_2O$ such that the mol ratio $MgCl_2$ to HCHO was 1 to 6. The results are shown in Table IV.

TABLE IV

| Sample | Wt. percent HCHO in solution | Wt. percent $MgCl_2 \cdot 6H_2O$ in solution | Pickup mols $MgCl_2 \cdot 6H_2O$ per 100 g. cell. | WI, percent before scour | WI, percent after scour |
|---|---|---|---|---|---|
| 1 | 0.5 | 0.56 | 0.00368 | 77 | 75 |
| 2 | 1.0 | 1.12 | 0.00743 | 65 | 62 |
| 3 | 1.5 | 1.68 | 0.0112 | 65 | 61 |
| 4 | 2.0 | 2.24 | 0.0149 | 50 | 49 |
| 5 | 3.0 | 3.36 | 0.0223 | 51 | 45 |
| 6 | 4.0 | 4.48 | 0.0298 | 39 | 40 |

*Example 5*

The procedure of Example 2 was repeated using proportions of HCHO and $MgCl_2 \cdot 6H_2O$ such that the mol ratio $MgCl_2$ to HCHO was about 1 to 5.6. The results are shown in Table V below.

TABLE V

| Sample | Wt. percent HCHO in solution | Wt. percent $MgCl_2 \cdot 6H_2O$ in solution | Pickup mols $MgCl_2 \cdot 6H_2O$ per 100 g. cell. | WI, percent before scour | WI, percent after scour |
|---|---|---|---|---|---|
| 1 | 0.5 | 0.6 | 0.00400 | 86 | 76 |
| 2 | 1.0 | 1.2 | 0.00798 | 71 | 64 |
| 3 | 1.5 | 1.8 | 0.0120 | 56 | 55 |
| 4 | 2.0 | 2.4 | 0.0159 | 51 | 48 |
| 5 | 3.0 | 3.6 | 0.0239 | 44 | 41 |
| 6 | 4.0 | 4.8 | 0.0318 | 39 | 40 |

*Example 6*

The procedure of Example 2 was repeated using proportions of HCHO and $MgCl_2 \cdot 6H_2O$ such that the mol ratio $MgCl_2$ to HCHO was 1 to 5. The results are shown in Table VI below.

TABLE VI

| Sample | Wt. percent HCHO in solution | Wt. percent $MgCl_2 \cdot 6H_2O$ in solution | Pickup mols $MgCl_2 \cdot 6H_2O$ per 100 g. cell. | WI, percent before scour | WI, percent after scour |
|---|---|---|---|---|---|
| 1 | 1 | 1.34 | 0.00890 | 66 | 63 |
| 2 | 2 | 2.68 | 0.0178 | 52 | 51 |
| 3 | 3 | 4.02 | 0.0267 | 44 | 43 |
| 4 | 4 | 5.36 | 0.0358 | 40 | 39 |

*Example 7*

The procedure of Example 2 was repeated using proportions of HCHO and $MgCl_2 \cdot 6H_2O$ such that the mol

---

[1] "Water imbibition" as used in this specification means the percent by weight of water retained in saturated material after centrifuging a 0.5 g. sample for 5 minutes at 1000 G. It is expressed as percent of the oven dry weight of the fiber (see Journal of the Society of Dyers and Colourists, October 1948, page 331).

ratio $MgCl_2$ to HCHO was 1 to 4. The results are shown in Table VII below.

TABLE VII

| Sample | Wt. percent HCHO in solution | Wt. percent $MgCl_2.6H_2O$ in solution | Pickup mols $MgCl_2.6H_2O$ per 100 g. cell. | WI, percent before scour | WI, percent after scour |
|---|---|---|---|---|---|
| 1 | 1 | 1.7 | 0.0103 | 65 | 58 |
| 2 | 2 | 3.4 | 0.0227 | 52 | 44 |
| 3 | 3 | 5.1 | 0.0340 | 43 | 41 |
| 4 | 4 | 6.8 | 0.0452 | 40 | 36 |

*Example 8*

To demonstrate the effect of the present treatment on the physical strength of fibers, samples having approximately equal water imbibition were chosen from each of the foregoing examples and their dry tenacity was measured. The results are shown in Table VIII.

TABLE VIII

| Sample from Example No. | Mol ratio, $MgCl_2.6H_2O$:HCHO | WI percent | Dry tenacity, g./denier |
|---|---|---|---|
| Control | 0 | 100 | 2.48 |
| 2 | 1:8.45 | 56 | 2.34 |
| 3 | 1:6.66 | 57 | 2.39 |
| 4 | 1:6 | 49 | 2.48 |
| 5 | 1:5.6 | 55 | 2.15 |
| 6 | 1:5 | 51 | 2.25 |
| 7 | 1:4 | 44 | 2.05 |

The data of Table VIII show that no serious strength losses are caused by the present process. Note that in Sample 4 no decrease at all occurred, though the water imbibition had been reduced to 49%.

*Example 9*

The following example shows the effect of pH above 5 on the process.

A stock solution was made up of 108 g. of 37% formaldehyde solution, 40 g. $MgCl_2.6H_2O$ and 852 g. water. The molar ratio $MgCl_2$ to HCHO in this solution was about 1 to 6.75 and the solution contained 4% by weight of each of HCHO and $MgCl_2$. It had a pH of 5.3.

The total stock solution was divided into five portions. To four of these portions were added various amounts of NaOH to give increased pH. Each portion was then used to treat 20 g. of never-dried viscose staple fiber. After treatment the fiber was dried and cured as described in Example 2. Water imbibition values for each fiber sample before and after scouring were determined and are reported in Table IX below.

TABLE IX

| Sample | pH of treating solution | WI, percent before scour | WI, percent after scour |
|---|---|---|---|
| 1 | 5.3 | 43 | 43 |
| 2 | 6.0 | 49 | 46 |
| 3 | 6.5 | 45 | 44 |
| 4 | 7.0 | 43 | 44 |
| 5 | 7.5 | 43 | 46 |

This illustrates that a low pH is not necessary for the present invention.

*Example 10*

The following example illustrates the effect of increasing the proportion of curing agent on the amount of aldehyde permanently bound to the cellulose.

Five samples of viscose rayon staple fiber were treated with a solution containing 6% HCHO and 0, 1.35, 4.07, 6.75 and 9.5% (by weight) $MgCl_2.6H_2O$. These proportions correspond to molal concentrations of 0, 0.067, 0.2, 0.35 and 0.47 respectively. The samples were centrifuged to about 100% pickup, and dried under vacuum. Portions of the samples were analysed for HCHO by stripping with 12 N $H_2SO_4$, using the chromotropic acid method described in Journal of the Textile Institute (Transactions) 1956, 47(6), T309–318. Other portions were cured at 160° C. for 6 minutes and then analysed for formaldehyde. The results are shown in Table X:

TABLE X

| Sample percent | HCHO Wt. percent in sol. | $MgCl_2.6H_2O$ | Molar Ratio, HCHO/$MgCl_2$ | Dried only HCHO (1), percent | Cured HCHO (2), percent | $\frac{(2)}{(1)} \times 100$ percent |
|---|---|---|---|---|---|---|
| 1 | 6 | 0 | --- | 4.4 | 2.7 | 62.7 |
| 2 | 6 | 1.35 | 30 | 4.1 | 2.5 | 60.7 |
| 3 | 6 | 4.07 | 10 | 3.9 | 3.0 | 78.2 |
| 4 | 6 | 6.75 | 6.06 | 4.0 | 3.4 | 84.9 |
| 5 | 6 | 9.5 | 4.25 | 4.2 | 3.8 | 90.5 |

It will be noted that the proportion of formaldehyde retained after curing relative to that applied, is very much greater at a molar ratio HCHO:$MgCl_2$ of 10:1 than 30:1; indeed the latter is slightly inferior to no magnesium chloride at all.

*Example 11*

The following example illustrates the use of magnesium bromide in the invention.

Six solutions containing $MgBr_2.6H_2O$ and 3% HCHO were prepared, using various ratios of $MgBr_2$ to HCHO. The solutions were used to treat never-dried viscose staple fiber and the water imbibition of the fiber before and after scouring was determined, all as in Example I. The results are shown in Table XI below.

TABLE XI

| Sample | Molar ratio HCHO/$MgBr_2$ | Weight ratio, HCHO/$MgBr_2.6H_2O$ | WI, percent before scour | WI, percent after scour |
|---|---|---|---|---|
| 1 | 1:30 | 3.10 | 57 | 53 |
| 2 | 1:15 | 1.54 | 45 | 47 |
| 3 | 1:10 | 1.03 | 45 | 45 |
| 4 | 1:7.5 | 0.770 | 43 | 44 |
| 5 | 1:6 | 0.616 | 45 | 40 |
| 6 | 1:5 | 0.514 | 43 | 39 |

*Example 12*

That the invention may be carried out on a continuous basis is shown by the following example.

A blanket of freshly spun, never-dried viscose rayon fiber (textile grade) still in the gel state after spinning and having a gel-state water imbibition value of 145% was squeezed between pressure rolls to a liquid retention of 100% on the weight of cellulose.

The squeezed blanket was then passed under a spray of an aqueous solution containing 1.5% HCHO (by weight), from a 46% methanol solution of formaldehyde, 1.25% magnesium chloride hexahydrate and 0.4% of a polyglycol stearate finishing agent.

The bath was adjusted to pH 6.4, with NaOH solution.

The impregnation was carried out in two stages with a pressurized intermediate squeeze and a final heavy squeeze (600 lb. per lineal inch) to a final liquid retention of about 100% on the weight of cellulose.

The treating bath was recirculated and replenished by metering in a concentrated mixture of magnesium chloride hexahydrate and formaldehyde. Similarly, concentrated finishing agent was added to the bath at a rate sufficient to maintain a constant concentration in the bath.

The treated, squeezed fiber blanket was opened, laid down as a bed on a conveyor, passed through a drier at a temperature of 145° F. (63° C.) and then through a cure zone at a temperature of 320° F. (160° C.). Dwell time in drier was 20 minutes and in the cure zone 7 minutes.

The fiber product had a water imbibition value of 57%, dry tenacity of 2.38 g./d., wet-tenacity of 1.69 g./d. One sample was scoured at pH 8 for 1 hour at the boil. The water imbibition was 50% after this treatment.

Another sample was scoured at pH 4 for 1 hour at the boil. Its water imbibition was 48% after this treatment.

Example 13

This example illustrates the use of $Mg(NO_3)_2$ as a curing agent.

Samples of never-dried viscose rayon staple fiber, still in the gel state after spinning were impregnated with aqueous solutions containing 3% by weight HCHO, varying amounts of $Mg(NO_3)_2.6H_2O$ and sufficient NaOH to bring the pH to 6.6. The samples were centrifuged to 140% pick-up on cellulose, dried at 80° C. and cured at 155° C. for 6 minutes. They were then tested for water imbibition and single fiber tenacities and elongation. The results are shown in Table XII.

TABLE XII

| $Mg(NO_3)_2.6H_2O$ percent in solution | HCHO percent sol. | mol ratio, salt:HCHO | Pickup mols salt/100 g. cell. | WI, percent | Dry ten., g./d. | Dry elong., percent |
|---|---|---|---|---|---|---|
| 2.0 | 3 | 1:12.8 | 0.0109 | 59 | 2.38 | 13.8 |
| 3.0 | 3 | 1:8.5 | 0.0163 | 53 | 2.16 | 11.9 |
| 4.0 | 3 | 1:6.4 | 0.0218 | 51 | 1.98 | 10.4 |
| 5.0 | 3 | 1:5.1 | 0.0274 | 50 | 1.94 | 10.3 |
| 6.0 | 3 | 1:4.3 | 0.0327 | 45 | 2.01 | 9.7 |

A control sample had a water imbibition (after drying) of 100%, a dry tenacity of 2.4 g./denier and a dry elongation of 21%.

Example 14

The procedure of Example 13 was repeated using $Mg(ClO_4)_2.6H_2O$ as a curing agent. The pH of the solution was adjusted to 6.0. The results are shown in Table XIII.

TABLE XIII

| $Mg(ClO_4)_2.6H_2O$ percent in solution | HCHO percent in sol. | Mol ratio, salt:HCHO | Pickup g.-mols salt per 100 g. cell. | WI, percent | Dry ten., g./d. | Dry elong., percent |
|---|---|---|---|---|---|---|
| 1.8 | 3 | 1:18.4 | 0.0076 | 48 | 2.08 | 11.8 |
| 2.4 | 3 | 1:13.1 | 0.0102 | 44 | 2.24 | 10.3 |
| 3.0 | 3 | 1:11.0 | 0.0127 | 41 | 1.87 | 9.1 |
| 4.0 | 3 | 1:8.3 | 0.0169 | 40 | 1.82 | 8.1 |

Example 15

The procedure of Example 13 was repeated using $ZnCl_2$ as a curing agent pH 5.4. The results appear in Table XIV.

TABLE XIV

| $ZnCl_2$ percent in sol. | HCHO percent in sol. | Mol ratio, salt:HCHO | Pickup g.-mols salt per 100 g. cell. | WI, percent | Dry ten., g./d. | Dry elong., percent |
|---|---|---|---|---|---|---|
| 0.9 | 3 | 1:15 | 0.00925 | 56 | 2.04 | 13.0 |
| 1.8 | 3 | 1:7.5 | 0.0185 | 51 | 2.00 | 10.4 |
| 2.4 | 3 | 1:5.7 | 0.0247 | 43 | 1.98 | 19.2 |
| 3 | 3 | 1:4.5 | 0.0309 | 42 | 1.85 | 8.3 |

Example 16

The procedure of Example 13 was repeated using zinc sulfate as curing agent at pH 5.5. The results are shown in Table XV.

TABLE XV

| $ZnSO_4.7H_2O$ percent in sol. | HCHO percent in sol. | Mol ratio, salt:HCHO | Pickup g.-mols salt per 100 g. cell. | WI, percent | Dry ten., g./d. | Dry elong., percent |
|---|---|---|---|---|---|---|
| 1.8 | 3 | 1:16 | 0.00876 | 58 | 1.99 | 12.7 |
| 2.4 | 3 | 1:12.5 | 0.0117 | 55 | 1.90 | 12.3 |
| 3.0 | 3 | 1:9.6 | 0.0146 | 52 | 1.88 | 12.0 |
| 4.0 | 3 | 1:7.2 | 0.0195 | 48 | 1.89 | 8.8 |
| 5.0 | 3 | 1:5.7 | 0.0243 | 46 | 1.93 | 10.3 |
| 6.0 | 3 | 1:4.8 | 0.0292 | 45 | 2.16 | 12.5 |

Example 17

The procedure of Example 13 was repeated using zinc nitrate as a curing agent at pH 5.2. The results appear in Table XVI.

TABLE XVI

| $Zn(NO_3)_2.6H_2O$ percent in sol | HCHO percent in sol. | Mol ratio, salt:HCHO | Pickup g.-mols salt per 100 g. cell. | WI, percent | Dry ten., g./d. | Dry elong., percent |
|---|---|---|---|---|---|---|
| 0.9 | 3 | 1:33.1 | 0.00424 | 52 | 1.91 | 9.2 |
| 1.8 | 3 | 1:16.5 | 0.00848 | 40 | 1.77 | 8.1 |
| 2.4 | 3 | 1:12.4 | 0.0113 | 39 | brittle | |

It will be observed that while $ZnNO_3$ is an effective agent for effecting cross linking, it has an objectionable effect in decreasing the strength of the cellulose. Most of the zinc salts have this drawback, compared to the magnesium salts but with zinc nitrate the effect is more marked. Preferably it is therefore used only in special situations.

Half of each sample was boiled in water for one hour, dried and pressed flat before testing.

Water imbibition and Monsanto wrinkle recovery tests were run on the samples before and after boiling. Results are shown in Table XVIII.

TABLE XVIII

| HCHO conc., percent | $MgCl_2.6H_2O$ conc., percent | PVA, percent | 40% acrylic polymer emulsion, percent | 40% Silicone emulsion, percent | Pickup g.-mols salt per 100 g. cell. | Before boil | | After boil | |
|---|---|---|---|---|---|---|---|---|---|
| | | | | | | WI, percent | WRA,[1] W+F, degrees | WI, percent | WRA,[1] W+F, degrees |
| 0 | 0 | 0 | 0 | 0 | 0 | 100 | 226 | 96 | |
| 3.3 | 3.7 | 0.24 | 0 | 2 | 0.0182 | 38 | 258 | 39 | 252 |
| 4.2 | 4.8 | 0.24 | 0 | 2 | 0.0236 | 30 | 266 | 34 | 278 |
| 5.2 | 5.9 | 0.24 | 0 | 2 | 0.0290 | 30 | 274 | 33 | 272 |
| 6.1 | 6.9 | 0.24 | 0 | 2 | 0.0340 | 29 | 290 | 30 | 288 |
| 3.3 | 3.7 | 0.24 | 3.0 | 2 | 0.0182 | 43 | 242 | 40 | 260 |
| 4.2 | 4.8 | 0.24 | 3.0 | 2 | 0.0236 | 41 | 252 | 42 | 256 |
| 5.2 | 5.9 | 0.24 | 3.0 | 2 | 0.0290 | 36 | 280 | 37 | 266 |
| 6.1 | 6.9 | 0.24 | 3.0 | 2 | 0.0340 | 31 | 284 | 34 | 286 |
| 6.1 | 6.9 | 0.24 | 0 | 2 | 0.0340 | 30 | 298 | 31 | 294 |
| 6.1 | 6.9 | 0.32 | 0 | 2 | 0.0340 | 32 | 292 | 31 | 292 |
| 6.1 | 6.9 | 0.40 | 0 | 2 | 0.0340 | 30 | 292 | 31 | 296 |
| 6.1 | 6.9 | 0.24 | 0 | 0 | 0.0340 | 29 | 294 | 31 | 292 |
| 6.1 | 6.9 | 0.32 | 0 | 0 | 0.0340 | 31 | 288 | 31 | 288 |
| 6.1 | 6.9 | 0.40 | 0 | 0 | 0.0340 | 29 | 286 | 31 | 286 |
| 6.1 | 6.9 | 0 | 0 | 2 | 0.0340 | 29 | 298 | 30 | 292 |
| 6.1 | 6.9 | 0 | 0 | 4 | 0.0340 | 28 | 292 | 32 | 288 |
| 6.1 | 6.9 | 0 | 0 | 6 | 0.0340 | 31 | 290 | 32 | 286 |

[1] WRA = wrinkle recovery angle.

*Example 18*

Samples of desized viscose rayon fabric (60 x 50) made from 3 denier staple fiber were treated with solutions containing 6% formaldehyde and varying amounts of $MgCl_2.6H_2O$ at pH 6.5. The solution also contained about 4% of a conventional silicone emulsion lubricant. The fabric samples were padded with the solution to 100% wet pick-up (based on the weight of dry fabric), placed on pin frames, dried at 80° C. and cured at 160° C. for 8 minutes. After curing the samples were washed, rinsed and pressed dry on a rotary ironer, conditioned and tested for wrinkle recovery and tensile strength. Wrinkle recovery measurements were made on a Monsanto wrinkle recovery tester.[2] In making tensile strength tests, approximately 1" strips were ravelled to a constant number of ends.

The results of the tests are shown in Table XVII.

TABLE XVII

| Sample | Wt. ratio, $HCHO/MgCl_2.6H_2O$ | Wrinkle recovery angle (W+F),[1] degrees | Tensile strength, lbs. |
|---|---|---|---|
| 1(Control) | 0 | 226 | 62 |
| 2 | 10.0 | 206 | 63 |
| 3 | 6.67 | 222 | 71 |
| 4 | 5.00 | 226 | 70 |
| 5 | 3.33 | 232 | 64 |
| 6 | 2.00 | 266 | 60 |
| 7 | 1.33 | 278 | 58 |
| 8 | 1 | 292 | 56 |
| 9 | 0.910 | 288 | 56 |

[1] Warp and filling.

*Example 19*

Samples of 60 x 50 viscose rayon fabric were treated with various concentrations of a mixture of formaldehyde and magnesium chloride hexahydrate (6:1 mol ratio) with varying amounts of polyvinyl alcohol (stiffening agent), of Rhoplex B-15, a 40% acrylic polymer emulsion made by Rohm and Haas (hand builder), and of Sylsoft 10, a 40% silicone emulsion made by Dow-Corning (lubricant). Samples were padded in the respective treating solutions to 100% pick-up (on dry fabric), dried on a pin frame at 80° C. and cured at 160° C. for 8 minutes. All samples were washed in a washing machine with a detergent before testing.

[2] See 1958 Technical Manual AATCC, p. 157.

Selected samples from the above were scoured in water at pH 4 to simulate scouring in a commercial laundry, rinsed in water, dried and retested. No measurable loss in wrinkle recovery properties was noted.

*Example 20*

Samples of desized and bleached cotton oxford (98 x 47) fabric were treated with various concentrations of a mixture of formaldehyde and magnesium chloride hexahydrate (6:1 mol ratio), with 0.3% polyvinyl alcohol and 4% of a 40% silicone emulsion. The pH of the solutions was adjusted to 8.0 with $Na_2CO_3$. The samples were dipped in the respective solutions, padded to 100% wet pick-up (on the dry fabric), placed on pin frames, dried at 80° C. and cured at 150° C. for 8 minutes. The samples were washed in detergent, dried and tested for wrinkle recovery and water imbibition. Results are shown below.

| HCHO conc., percent | $MgCl_2.6H_2O$ conc., percent | Pickup g.-mols salt per 100 g. cell. | Water Imbibition, percent | Wrinkle recovery, W+F, degrees |
|---|---|---|---|---|
| 0 | 0 | 0 | 44 | 170 |
| 2.4 | 2.7 | 0.0133 | 29 | 234 |
| 3.3 | 3.7 | 0.0182 | 29 | 238 |
| 4.2 | 4.8 | 0.0236 | 28 | 254 |
| 5.2 | 5.9 | 0.0291 | 26 | 252 |
| 6.1 | 6.9 | 0.0340 | 26 | 256 |

*Example 21*

A plain weave fabric of 88 x 60 construction, made from 1/32's cotton count, 1½ denier bright viscose rayon, 1 7/16" staple fiber was treated with a bath (pH 6.5) containing:

| | Parts |
|---|---|
| Aqueous formaldehyde (40 percent containing 7–8% methanol) | 16 |
| Magnesium chloride hexahydrate | 6 |
| Silicone lubricant emulsion (40%) (Drisil 148) | 4 |
| Catalyst for the silicone | 0.8 |
| Starch ether (hand builder) | 0.25 |
| Water to make 100 parts by weight. | |

The fabric was padded in this bath to about 100% wet pick-up on the dry fabric, dried on a pin stenter at 135° C. and cured for 5 minutes at 160° C. It was then rinsed in hot water, washed off in a 2 g./liter soap solution and dried on an overfeed pin stenter. The resulting fabric underwent negligible shrinkage when subjected to the machine wash shrinkage test at 200° F. whereas the original fabric shrank about 10% in the warp and 5% in the filling direction under the same treatment. The water imbibition of the treated fabric was 36% as against 100% for the untreated fabric.

*Example 22*

Bleached cotton broadcloth (109 x 58) was treated with a bath containing 3.87% magnesium chloride $$(MgCl_2.6H_2O)$$

1.8% HCHO, 3% polyethylene emulsion (softener) and sufficient $Na_2CO_3$ to bring the pH to 8.6. The fabric was added to 65% pickup, depositing 0.0124 mol/100 g. of cellulose on the fabric with a mol ratio, salt of HCHO of about 1:3.14. The fabric was dried on a tenter frame at 205° F. for 15 seconds and at 300° F. for 15 seconds, and then cured at 315° F. for 93 seconds.

The fabric contained 0.41% bound formaldehyde, had a Monsanto dry crease recovery of 243° (W+F) and 62% of the control fabric tensile strength.

*Example 23*

Bleached, mercerized cotton broadcloth (109 x 58) was treated with the same bath and under the same conditions as in Example 21. This fabric contained 0.52% bound formaldehyde, had a Monsanto crease recovery of 255° (W+F) and 52% of the control fabric tensile strength.

*Example 24*

An olive green rayon challis was treated with a bath containing 3.4% by weight $MgCl_2.6H_2O$, 3.44% by weight HCHO and conventional softeners and hand builders to give 75% wet pick-up on the dry fabric. The pH of the bath was 6.3. The fabric was then dried at 275° F. and 330° F. and cured at 335° F. for 90 seconds. It was next back washed with water, sodium sulfite, acetic acid, water and a conventional softener, frame dried and sanforized with 2% compression. The finished goods contained 1.23% HCHO. After scouring at pH 8 and 95–100° C. for 1 hour their HCHO content was 1.16%. Other properties are shown in Table XIX.

TABLE XX

| Curing agent | pH of solution, as mixed | pH adjusted to— | Time of cure (min.) | Water imbibition, percent |
|---|---|---|---|---|
| $MgCl_2.6H_2O$ | 3.1 | 5 | 6 | 29 |
| $MgCl_2.6H_2O$ | 3.1 | 5 | 8 | 27 |
| $BaCl_2.2H_2O$ | 3.7 | 5 | 6 | 82 |
| $BaCl_2.2H_2O$ | 3.7 | 5 | 8 | 78 |
| $CaCl_2$ | 3.7 | 5 | 6 | 40 |
| $CaCl_2$ | 3.7 | 5 | 8 | 48 |
| $CaBr_2$ | 3.7 | 5 | 6 | 38 |
| $CaBr_2$ | 3.7 | 5 | 8 | 46 |
| $CaI_2$ | 9.2 | | 6 | 33 |
| $CaI_2$ | 9.2 | | 8 | 30 |
| $Ca(CNS)_2$ | 3.9 | 5 | 6 | 50 |
| $Ca(CNS)_2$ | 3.9 | 5 | 8 | 50 |
| $Ca(NO_3)_2$ | 3.8 | 5 | 6 | 59 |
| $Ca(NO_3)_2$ | 3.8 | 5 | 8 | 49 |
| $CdCl_2.2\frac{1}{2}H_2O$ | 3.5 | 5 | 6 | 43 |
| $CdCl_2.2\frac{1}{2}H_2O$ | 3.5 | 5 | 8 | 41 |

We claim:
1. A method for cross linking cellulose which comprises impregnating the cellulose with formaldehyde and with a curing agent, in the presence of water, at a pH of between about 5 and about 10, the curing agent being a metallic salt which is a Lewis acid in the solid state and which is water soluble to the extent of at least 0.03 g.-mol/liter at 20° C., at pH 5; the pick-up of curing agent being between about 0.003 and about 0.09 g.-mol per 100 g. of cellulose, and subsequently curing the impregnated cellulose to chemically bind between about 0.1 and about 7% formaldehyde, by weight of the cellulose, to the cellulose.

2. The method claimed in claim 1 wherein between about 0.1 and about 3% by weight formaldehyde is bound to the cellulose.

3. The method claimed in claim 1 wherein the curing agent is magnesium chloride.

4. A method of cross-linking cellulose which comprises impregnating the cellulose with formaldehyde and a curing agent in the presence of water, at a pH of between about 5 and about 10, the curing agent being a metallic salt which is a Lewis acid in the solid state and which is water soluble to the extent of at least 0.03 mol/liter at 20° C., at pH 5; the pick-up of curing agent being between about 0.003 and about 0.09 g.-mol, per 100 g. of cellulose,

TABLE XIX

| Sample | Tear strength lbs. | | Tensile strength lbs | | Flex abras. stoll cycles (1 x 3) | | Crease angle | | Percent shrinkage, 160° F., 10 Wash | |
|---|---|---|---|---|---|---|---|---|---|---|
| | Warp | Filling | Warp | Filling | Warp | Filling | Warp | Filling | Warp | Filling |
| Control | 2.2 | 2.2 | 42 | 44 | 184 | 134 | 82 | 101 | −19.0 | −5.0 |
| Treated | 4.5 | 4.7 | 44 | 44 | | 250 | 125 | 121 | −1.5 | −1.0 |

*Example 25*

Continuous filament viscose yarn was impregnated with a solution containing 6% (by weight) formaldehyde and sufficient curing agent to give a molar ratio of curing agent:formaldehyde of 0.297:2. In those cases where the pH of the solution as prepared was less than 5 it was adjusted to pH 5. All samples were impregnated for 15 minutes, centrifuged for five minutes at 1000 G to give a pick-up of about 82%, dried for ½ hour at 80° C. and cured for the time shown at 160° C. Results are shown below in Table XX.

and the mol ratio of salt to formaldehyde deposited on said cellulose being between about 1:17 and about 5:1 and drying and curing the impregnated cellulose.

5. A method for cross linking cellulose which comprises impregnating the cellulose with formaldehyde and with a curing agent in the presence of water, at a pH of between about 5 and about 10, the curing agent being selected from the group consisting of magnesium chloride, magnesium bromide, magnesium iodide, magnesium nitrate, magnesium perchlorate, zinc nitrate, zinc chloride, zinc sulfate, calcium chloride, calcium bromide, calcium iodide, calcium nitrate, calcium thiocyanate, barium chloride, strontium chloride and cadmium chloride, the pick-up for curing agent being between about 0.003 and about 0.09 g.-mol per 100 g. of cellulose and subsequently curing the impregnated cellulose, to chemically bind between about 0.1 and about 7% formaldehyde to the cellulose.

6. A method for cross linking cellulose which comprises impregnating cellulose, in the presence of water, at a pH between about 5 and about 10, with formaldehyde and with a salt of a group II metal and a strong monobasic acid which is at least 50% ionized in normal aqueous solution at 18° C., said salt being a Lewis acid in the solid state and water-soluble to the extent of at least 0.03 mol/l. at 20° C. at pH 5, to deposit formaldehyde and between about 0.003 and about 0.09 mol of salt, per 100 g. of cellulose on the cellulose, and subsequently curing the impregnated cellulose to chemically bind between about .1 and about 7% formaldehyde to the cellulose.

7. A method for cross linking cellulose which comprises impregnating cellulose with an aqueous solution containing formaldehyde and a curing agent, said solution having a pH of between about 5 and about 10, said curing agent being a magnesium salt which is a Lewis acid in the solid state and which is soluble to the extent of at least 0.03 g. mol per liter in aqueous solution at pH 5 and at 20° C., the total pick-up of salt being between about 0.008 and about 0.054 g. mol per 100 g. cellulose, and drying and curing the impregnated cellulose to chemically bind between about 0.1% and about 3% formaldehyde, by weight of the cellulose, to the cellulose.

8. A method for cross linking cellulose which comprises impregnating cellulose with an aqueous solution containing formaldehyde and a curing agent, said solution having a pH of between about 5 and about 10, said curing agent being a magnesium salt which is a Lewis acid in the solid state and which is soluble to the extent of at least 0.03 g.-mol per liter in aqueous solution at pH 5 and at 20° C., the total pick-up of salt being between about 0.008 and about 0.054 g.-mol per 100 g. of cellulose and the mol ratio of salt to formaldehyde being between about 1:12 and about 1:1, and drying and curing the impregnated cellulose.

9. A method for cross linking natural cellulose material which comprises impregnating said material with an aqueous solution containing formaldehyde and a curing agent, said solution having a pH of between about 6 and about 10, said curing agent being a magnesium salt which is a Lewis acid in the solid state and which is soluble to the extent of at least 0.03 mol per liter in aqueous solution at pH 6 and at 20° C., the total pick-up of salt being between about 0.008 and about 0.054 g.-mol per 100 g. of cellulose, and drying and curing the impregnated cellulose to chemically bind on the cellulose between about 0.1 and about 3% formaldehyde, based on the weight of the cellulose.

10. A method for cross linking natural cellulose material which comprises impregnating said material with an aqueous solution containing formaldehyde and a curing agent, said solution having a pH of between about 6 and about 10, said curing agent being a magnesium salt which is a Lewis acid in the solid state, and which is soluble to the extent of at least 0.03 mol/liter in aqueous solution at pH 6 and at 20° C., the total pick-up of salt being between about 0.008 and about 0.054 g.-mol per 100 g. of cellulose, and the mol ratio of salt to formaldehyde deposited on said cellulose being between about 1:12 and about 1:1, and drying and curing the impregnated cellulose.

11. A method for cross-linking cellulose which comprises impregnating cellulose with an aqueous solution having a pH from about 5 to about 10 and comprising at least about 0.5% by weight formaldehyde and between about 0.03 and about 0.9 g.-mol/liter of a curing agent which is a metallic salt and a Lewis acid in the solid state to deposit on the cellulose between about 0.003 and about 0.09 g.-mol of curing agent per 100 g. of cellulose and sufficient formaldehyde to give a ratio of curing agent to formaldehyde of between about 1:17 and about 5:1, drying said impregnated cellulose and heating said cellulose to between about 110° C. and about 180° C. for between about 30 minutes and about 5 seconds to effect the cross linking reaction.

12. A method for cross-linking cellulose which comprises impregnating cellulose with an aqueous solution having a pH from about 5 to about 10 and comprising at least about 0.5% by weight formaldehyde and between about 0.03 and about 0.9 g.-mol per liter of a curing agent which is a metallic salt and a Lewis acid in the solid state, to deposit on the cellulose formaldehyde, and between about 0.003 and about 0.09 g.-mol of curing agent per 100 g. of cellulose, drying said impregnated cellulose and heating said cellulose to between about 110° C. and about 180° C. for between about 30 minutes and about 5 seconds to chemically bind between about 0.1% and about 7% formaldehyde, based on the weight of the cellulose, to said cellulose.

13. A method for cross-linking natural cellulose which comprises impregnating natural cellulose with an aqueous solution having a pH from about 6 to about 10 and comprising between about 0.5 and about 4% by weight formaldehyde and between about 0.03 and about 0.9-mol/liter of a curing agent which is a metallic salt and is a Lewis acid in the solid state to deposit on the cellulose between about 0.008 and about 0.09 g.-mol of curing agent per 100 g. of cellulose and sufficient formaldehyde to give a ratio of curing agent to formaldehyde of between about 1:12 and about 1:1, drying said impregnated cellulose and heating said cellulose to between about 110° C. and about 180° C. for between about 30 minutes and about 5 seconds to effect the cross linking reaction.

14. A cross linked regenerated cellulose fabric having a dry Monsanto crease recovery angle (W+F) at least 50° greater than untreated fabric, containing between about 0.80 and about 7% by weight formaldehyde bound directly to the cellulose and having a tensile strength not less than about 80% of the same fabric not cross linked.

15. An aqueous solution for cross linking cellulose which comprises between about 0.5% and about 6% by weight formaldehyde and between about 0.03 and about 0.9 g.-mol/liter of a curing agent which is a metallic salt and a Lewis acid in the solid state, said solution having a pH of between about 5 and about 10.

16. The solution claimed in claim 15 wherein the salt is a magnesium salt.

17. The solution claimed in claim 16 wherein the salt is magnesium chloride.

18. An aqueous solution for cross linking cellulose which comprises between about 0.5 and about 6% formaldehyde and between about 0.03 and about 0.9 mol/liter of a salt of a group II metal and a strong inorganic acid which is a Lewis acid in the solid state and is at least 50% ionized at 18° C., said solution having a pH between about 5 and about 10.

References Cited in the file of this patent

UNITED STATES PATENTS

| | | |
|---|---|---|
| 2,080,043 | Heckert | May 11, 1937 |
| 2,119,150 | Bowen | May 31, 1938 |
| 2,163,204 | Lantz et al. | June 20, 1939 |
| 2,311,080 | Pinkney | Feb. 16, 1943 |
| 2,412,832 | Pfeffer et al. | Dec. 17, 1946 |
| 2,530,175 | Pfeffer et al. | Nov. 14, 1950 |
| 2,771,337 | Gagarine | Nov. 20, 1956 |
| 2,826,514 | Schroeder | Mar. 11, 1958 |
| 2,922,768 | Mino et al. | Jan. 26, 1960 |
| 2,957,746 | Buck et al. | Oct. 25, 1960 |
| 3,043,719 | Burr | July 10, 1962 |
| 3,046,079 | Reeves | July 24, 1962 |

(Other references on following page)

FOREIGN PATENTS

| | | |
|---|---|---|
| 101,850 | Australia | Aug. 17, 1937 |
| 462,005 | Great Britain | Mar. 1, 1937 |
| 477,084 | Great Britain | Dec. 21, 1937 |
| 502,724 | Great Britain | Mar. 21, 1939 |
| 565,337 | Great Britain | Nov. 7, 1944 |
| 575,964 | Great Britain | Mar. 13, 1946 |

OTHER REFERENCES

Tripp et al.: Textile Research Journal, vol 28, November 5, pp. 404–417 (1958).

O'Brien et al.: Textile Research Journal, vol. 31, No. 3, March 1961 (pp. 276–281), Proceedings of paper presented April 7, 1960.